(12) United States Patent
Yokota et al.

(10) Patent No.: US 7,170,558 B2
(45) Date of Patent: Jan. 30, 2007

(54) COMPACT AND LOW-PROFILE DIGITAL CAMERA

(75) Inventors: Satoshi Yokota, Toyonaka (JP); Akira Kosaka, Yao (JP); Toshiyuki Tanaka, Nishinomiya (JP); Yoshihiro Hara, Kishiwada (JP); Kazuaki Matsui, Osaka (JP); Sadanobu Ueda, Osaka (JP); Yoshito Iwasawa, Tokyo (JP)

(73) Assignee: Minolta Co., Ltd., Osaka (JP)

( * ) Notice: Subject to any disclaimer, the term of this patent is extended or adjusted under 35 U.S.C. 154(b) by 748 days.

(21) Appl. No.: 10/395,084

(22) Filed: Mar. 25, 2003

(65) Prior Publication Data

US 2004/0109076 A1 Jun. 10, 2004

(30) Foreign Application Priority Data

Dec. 10, 2002 (JP) ............................. 2002-357908

(51) Int. Cl.
*H04N 9/07* (2006.01)
(52) U.S. Cl. ...................... 348/337; 348/340; 348/344; 359/372
(58) Field of Classification Search ................ 348/335, 348/344, 337, 340; 359/351, 367, 372
See application file for complete search history.

(56) References Cited

U.S. PATENT DOCUMENTS

| 4,114,171 | A | * | 9/1978 | Altman | 396/351 |
| 4,235,541 | A | * | 11/1980 | Jamel | 396/432 |
| 4,249,798 | A | * | 2/1981 | Moskovich | 359/683 |
| 4,868,588 | A | * | 9/1989 | Hajnal | 396/432 |
| 5,469,236 | A | * | 11/1995 | Roessel | 396/432 |
| 6,498,624 | B1 | * | 12/2002 | Ogura et al. | 348/335 |
| 6,829,011 | B1 | * | 12/2004 | Higuchi et al. | 348/340 |
| 6,850,279 | B1 | * | 2/2005 | Scherling | 348/335 |
| 6,970,201 | B1 | * | 11/2005 | Neil | 348/335 |
| 2004/0095503 | A1 | * | 5/2004 | Iwasawa et al. | 348/344 |
| 2004/0169772 | A1 | * | 9/2004 | Matsui et al. | 348/375 |

FOREIGN PATENT DOCUMENTS

| JP | 01-186073 | 7/1989 |
| JP | 8-130702 | 5/1996 |
| JP | 9-163206 | 6/1997 |
| JP | 10-191125 | 7/1998 |
| JP | 10-253886 | 9/1998 |
| JP | 10-282560 | 10/1998 |
| JP | 11-271867 | 10/1999 |
| JP | 2002-287224 | 10/2002 |
| WO | WO 97/49003 | 12/1997 |

* cited by examiner

*Primary Examiner*—Ngoc-Yen Vu
*Assistant Examiner*—Gary C. Vieaux
(74) *Attorney, Agent, or Firm*—McDermott Will & Emery LLP

(57) ABSTRACT

A digital camera which allows to make thickness, height and width of its camera body small. The camera has a first optical member for generally perpendicularly bending a first optical axis of light coming from an object through a lens opening part, a second optical member for bending a second optical axis of light coming from the first optical member, and an image taking element having a light receiving surface for receiving a third optical axis of light coming from the second optical member in which the light receiving surface crosses the third optical axis of light. The third optical axis of light is included in a plane which is different from a plane including both of the first optical axis of light and the second optical axis thereof.

20 Claims, 9 Drawing Sheets

COMPACT AND LOW-PROFILE DIGITAL CAMERA

This application is based upon application No. 2002-357908 filed in Japan, the contents of which are hereby incorporated by reference.

BACKGROUND OF THE INVENTION

1. Field of the Invention

The present invention generally relates to a digital camera, and particularly relates to the digital camera which is low-profile and compact in size.

2. Description of the Related Art

There have been proposed a variety of cameras each of which has a bending optical system (or a flexion optical system) in which its optical axis is bent.

For example, Japanese Laid-Open Patent Publication Nos. 8-130702, 9-163206, 10-253886, 10-191125, 10-282560 and 2002-287224, disclose some cameras or image-taking devices, each of which has a bending optical system (or a flexion optical system) in which an optical axis is bent once. More specifically, Japanese Laid-Open Patent Publication No. 8-130702 discloses a card-shaped camera in which the optical axis is bent once by a mirror or prism in the bending optical system. Meanwhile, Japanese Laid-Open Patent Publication No. 9-163206 discloses a video camera having a bending optical system in which an optical axis is bent once. Meanwhile, Japanese Laid-Open Patent Publication No. 10-253886 discloses a camera in which its bending optical system, with an optical axis being bent once, is arranged sideways. Meanwhile, Japanese Laid-Open Patent Publication No. 10-191125 discloses an arrangement, or a structure, of a camera having a bending optical system in which an optical axis is bent once. Meanwhile, Japanese Laid-Open Patent Publication No. 10-282560 discloses a camera in which a folding type of mirror is accommodated. Meanwhile, Japanese Laid-Open Patent Publication No. 2002-287224 discloses a low-profile (i.e. thin) and rectangular-shaped camera which employs a bending optical system.

On the other hand, International Publication No. WO 97/49003 (International Application No. PCT/DK97/00261) discloses an optical image recording apparatus having a bending optical system in which its optical axis is bent twice within the same plane.

For example, by adopting such a bending optical system in which its optical axis is bent once, it is possible to downsize (or make small) the dimension of a camera body having the bending optical system in the direction in which the camera is moved relative to an object (or subject). That is, by adopting the bending optical system, it is possible to make thinner the camera body and to realize a low-profile camera. However, if the bending optical system is longer, the dimension of the camera in the direction which is other than the aforementioned direction in which the camera is moved relative thereto, becomes greater, thus making it difficult to make the camera compact. Generally, there is a tendency: higher magnification of a zoom lens, bigger its optical system. Therefore, it is difficult to simultaneously realize both of the downsizing of the camera body and higher magnification thereof.

SUMMARY OF THE INVENTION

Therefore, it is an object of the present invention to provide a digital camera having a construction, or mechanism which allows not only to make thinner the camera body in the direction in which the camera is moved relative to the object (i.e. to make the camera body more low-profile), but also to make smaller the camera body in the direction which is other than the aforementioned direction in which the camera is moved relative thereto.

In accomplishing this and other objects of the present invention, there is provided a digital camera comprising: a camera body which is generally rectangular parallelepiped in shape, in which the camera body has a front surface wall that is opposite to an object and that has an opening part, and in which thickness of the camera body in a direction in which the front surface wall is opposite to the object is smaller than height of the camera body and is smaller than width of the camera body; a first reflection member which is mounted inside the camera body, in which the first reflection member has a first reflection surface for generally perpendicularly bending a first optical axis of light which is incident through the opening part of the camera body, and in which the first optical axis of light is generally perpendicular to the front surface wall of the camera body; and a second reflection member which is mounted inside the camera body, in which the second reflection member has a second reflection surface for bending a second optical axis of light having been bent by the first reflection surface, into a third optical axis of light, and in which each of the second optical axis and the third optical axis is generally in parallel with the front surface wall of the camera body.

According to the mechanism, each of the second optical axis and the third optical axis is included in a plane which is generally in parallel with the front surface wall of the camera body. Therefore, it is possible to make small the size, or thickness, of the camera body in the direction of the first optical axis of light. In other words, with the mechanism, it is possible to realize a low-profile digital camera.

More specifically, according to the mechanism, the optical axis of light is bent twice by the first reflection surface of the first reflection member and by the second reflection surface of the second reflection member, inside the camera body. Namely, with the mechanism, it is possible to make the optical system (or optical unit) longer inside the camera body without causing enlargement thereof as a whole. Hence, with the mechanism, it is possible not only to make thinner the camera body in the direction in which the camera is moved relative to the object (i.e. to make the camera body more low-profile), but also to make smaller the camera body in the direction which is other than the direction in which the camera is moved relative thereto.

In the mechanism, there can be provided an image taking element having a light receiving surface which is positioned so as to cross the third optical axis of light; and at least one lens element which is provided between the opening part of the camera body and the light receiving surface of the image taking element.

Preferably, in the mechanism, there is provided a grip part which is constituted by a projecting part of the camera body, in which the grip part is provided at least on one end of the camera body in a direction of the width thereof, in which the image taking element is mounted inside the grip part.

According to the mechanism, at least one component, like the image taking element, can be mounted in a space which is formed inside the grip part. Therefore, the camera body can be downsized effectively, as a whole.

Also, according to the mechanism, the grip part is provided the at least on one end of the camera body in the direction of the width thereof. Therefore, with the mechanism, it is possible to make shorter the distance through which any heat generated by the image taking element is released, or dissipated. In other words, with the mechanism, the heat generated from the image taking element is let to go outside of the camera body easily and effectively.

In the mechanism, for example, the opening part of the camera body can be provided adjacent to a corner of the front surface wall thereof, wherein the camera body has four side surface walls connecting to the front surface wall, in which the second optical axis of light and the third optical axis thereof extend along adjacent two side surface walls of the four side surface walls.

According to the mechanism, its optical system including the first reflection member and the second reflection member, for example, is arranged near to a peripheral side wall connecting to the front surface wall. Therefore, it is possible to enhance the degree of freedom (or design freedom) for arranging other components inside the camera body; and the mechanism allows a component having a large height and a large width to be mounted inside the camera body, for example.

Alternatively, the opening part of the camera body can be provided generally at a central part of the front surface wall, wherein the camera body has four side surface walls connecting to the front surface wall, in which the second optical axis of light extends towards one of the four side surface walls, and in which the third optical axis thereof extends along the one of the four side surface walls.

According to the mechanism, the opening part locates generally at the central part of the front surface wall of the camera body. Therefore, with the mechanism, when its user holds the camera body by one or both of his/her hands, the opening part, as an image input region, is effectively prevented from being masked or covered by the fingers.

In the mechanism, the camera body can comprise a camera part and a lens part, wherein the camera part and the lens part can be connected to each other removably.

In the mechanism, preferably, the lens part is interchangeable.

In the mechanism, the lens part can be selected from one of interchangeable lenses including a zoom lens, a telephoto lens, a macro lens and a wideangle lens, for example.

In the mechanism, the lens part which is interchangeable, can comprise an auxiliary flash emitter, a focussing device and an auxiliary electric source.

In the mechanism, the lens part which is interchangeable, can further comprise a focus adjustment member.

In the mechanism, preferably, the camera part is interchangeable.

In accomplishing the aforementioned objects of the present invention, according to another aspect thereof, there is provided a digital camera comprising: a camera body having a front surface which is opposite to an object, in which the front surface has an opening part; a first reflection member which is mounted inside the camera body, in which the first reflection member has a first reflection surface for generally perpendicularly bending a first optical axis of light which is incident through the opening part of the camera body; and a second reflection member which is mounted inside the camera body, in which the second reflection member has a second reflection surface for bending a second optical axis of light having been bent by the first reflection surface, into a third optical axis of light, in which the third optical axis of light is included in a plane which is different from a plane in which both of the first optical axis of light and the second optical axis of light are included.

According to the mechanism, the third optical axis of light is included in the plane which is different from the plane in which both of the first optical axis of light and the second optical axis of light are included. Therefore, in comparison with an arrangement in which the third optical axis is included in a plane in which both of the first optical axis of light and the second optical axis of light are included, it is possible to diminish, or reduce, the dimension of the camera body, in the direction of the first optical axis of light (i.e. in the direction in which the camera body is moved relative to the object). In other words, with the mechanism, it is possible to realize a low-profile digital camera.

More specifically, according to the mechanism, the optical axis of light is bent twice by the first reflection surface of the first reflection member and by the second reflection surface of the second reflection member, inside the camera body. Namely, with the mechanism, it is possible to make the optical system (or optical unit) longer inside the camera body without causing enlargement thereof as a whole. Hence, with the mechanism, it is possible not only to make thinner the camera body in the direction in which the camera is moved relative to the object (i.e. to make the camera body more low-profile), but also to make smaller the camera body in the direction which is other than the direction in which the camera is moved relative thereto.

In the mechanism, the camera body can comprise a camera part and a lens part, wherein the camera part and the lens part can be connected to each other removably.

In the mechanism, preferably, the lens part is interchangeable.

In the mechanism, for example, the lens part can be selected from one of interchangeable lenses including a zoom lens, a telephoto lens, a macro lens and a wideangle lens, for example.

In the mechanism, the lens part which is interchangeable, can comprise an auxiliary flash emitter, a focussing device and an auxiliary electric source.

In the mechanism, the lens part which is interchangeable, can further comprise a focus adjustment member.

In the mechanism, preferably, the camera part is interchangeable.

BRIEF DESCRIPTION OF THE DRAWINGS

This and other objects and features of the present invention will become clear from the following description taken in conjunction with the preferred embodiments thereof with reference to the accompanying drawings.

DETAILED DESCRIPTION OF THE PREFERRED EMBODIMENTS

Figure 1A:
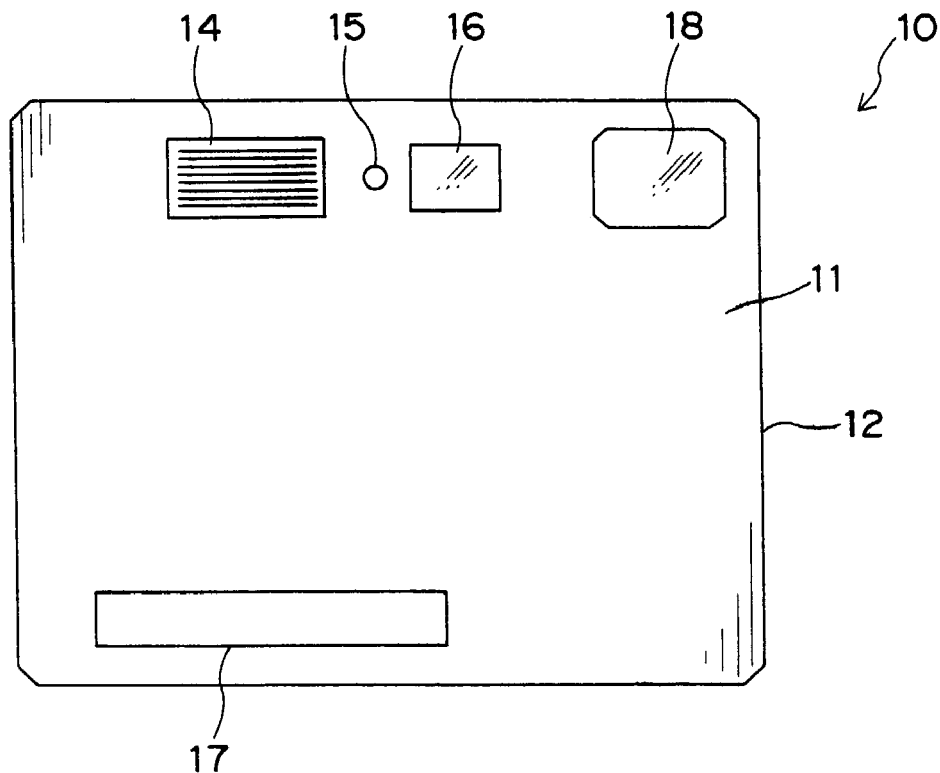
FIG. 1A is a front view of a digital camera according to a first embodiment of the present invention.

Before a description of preferred embodiments of the present invention proceeds, it is to be noted that like or corresponding parts are designated by like reference numerals throughout the accompanying drawings.

With reference to FIGS. 1A through 4A, and 5A through 10B, it is explained about a digital camera according to each of the preferred embodiments of the present invention.

Firstly, with reference to FIGS. 1A, 1B, 2, 3A, 3B, 4A and 4B, a description is made below upon the digital camera according to a first embodiment thereof.

As shown in FIG. 1A, the digital camera 10 has a flash emitter 14, a photometric sensor 15, and a viewfinder window 16, all of which are arranged on an upper part of a front surface 11 of a camera body 12 thereof; and the camera 10 has a lens opening part 18 which is arranged on an upper right part of the front surface 11 of the camera body 12. A reference numeral 17 indicates a name plate in the same figure, but the name plate 17 may not necessarily be mounted on the camera body 12.

Figure 1B:
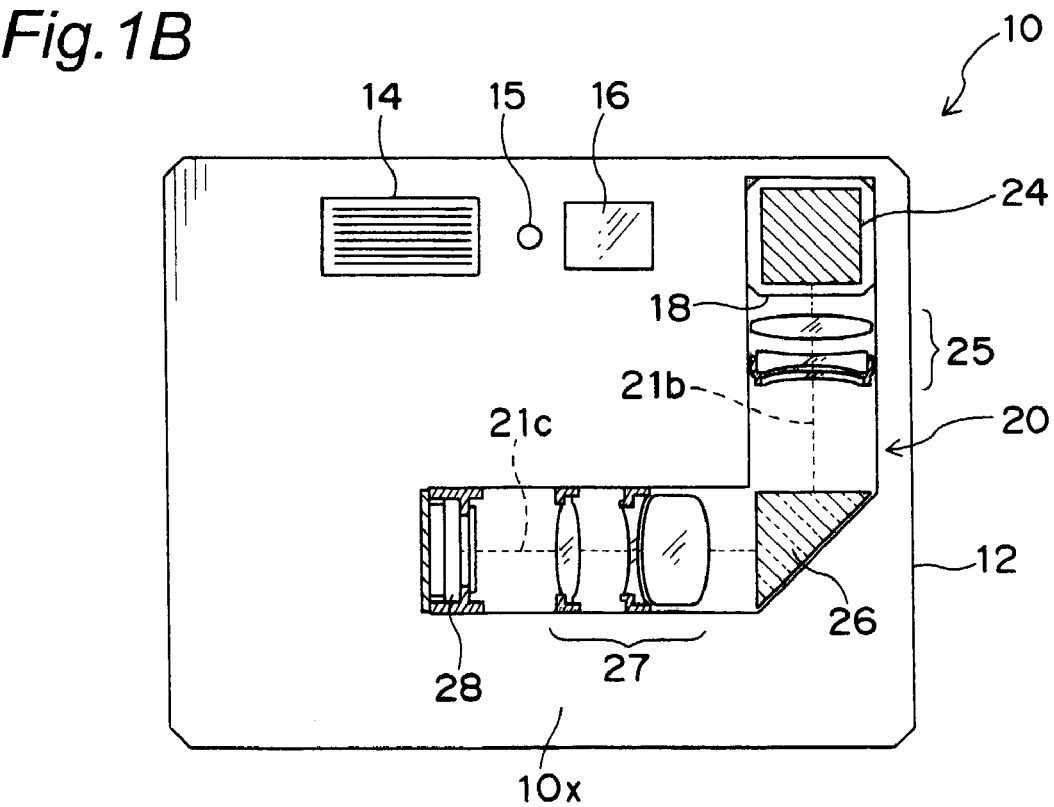
FIG. 1B is a partially cross-sectional front view of the digital camera of FIG. 1A.

As shown in FIG. 1B, within the camera body 12, there is arranged a bending optical unit or system (a flexion optical unit or system) 20 which is formed L-shaped. One end of the bending optical unit 20 faces, or opposes, the lens opening part 18. A light (hereinafter, referred to as "object light") coming from an object, firstly passes through the lens opening part 18, is refracted, or bent, downwards by a first triangular prism 24 (hereinafter, referred to as "first light bending" to denote such a bending of the object light by the first triangular prism 24), is refracted, or bent, leftward and horizontally by a second triangular prism 26 (hereinafter, referred to as "second light bending" to denote such a bending of the object light by the second triangular prism 26), and then reaches an image taking element 28 which locates at the other end of the bending optical unit 20.

Generally, the image taking element 28 can be an CCD image sensor. However, as the image taking element 28, another type of image sensor, such as a CMOS image sensor, can be employed, alternatively.

Inside the bending optical unit 20, there are also arranged a pair of different lens units 25 and 27 which are driven separately, or independently, by motors. As shown in FIG. 1B, a space 10X forms underneath the bending optical unit 20. In this space 10X, for example, there can be arranged a battery, a capacitor for a flash light emitting part, a slot for a recording medium, etc.

Figure 2:
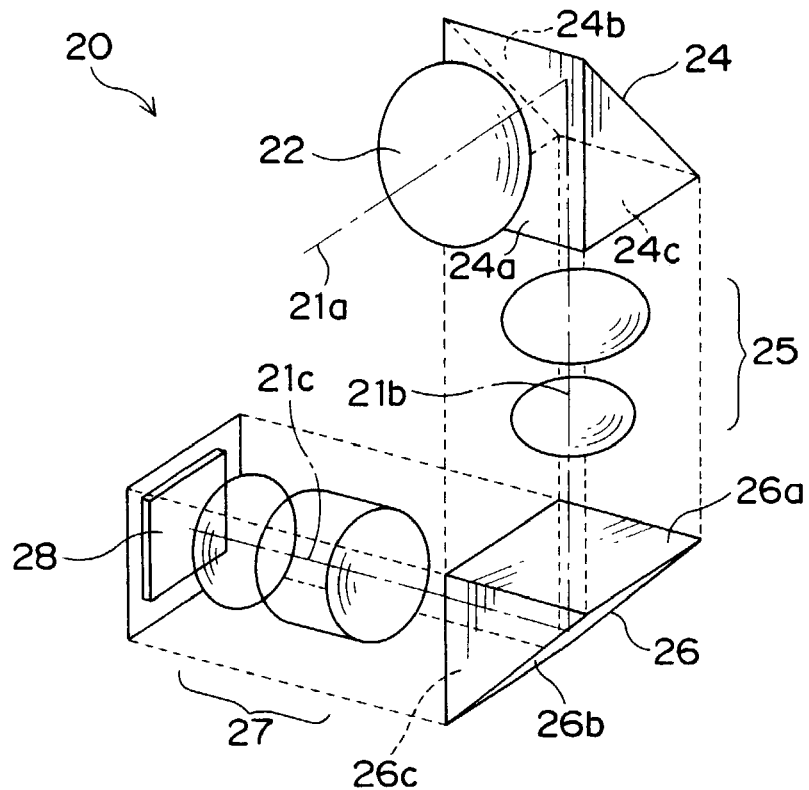
FIG. 2 is a perspective view to explanatorily show a main part of a bending optical unit of the digital camera according to the first embodiment.
Figure 3A:
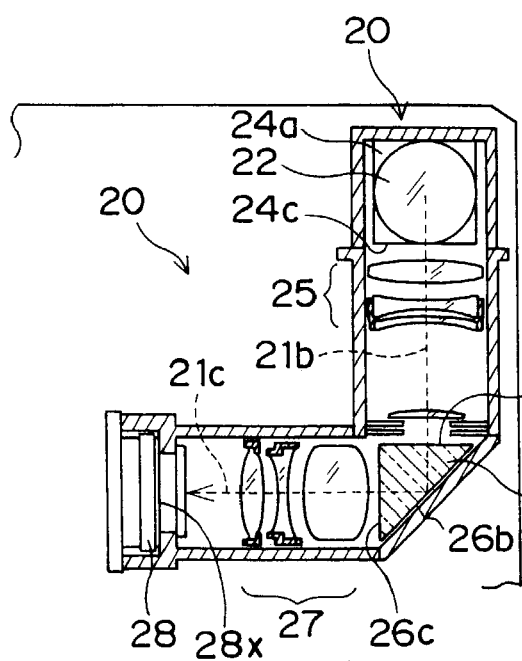
FIG. 3A is a partial front cross-sectional view of a main part of the digital camera according to the first embodiment.
Figure 3B:
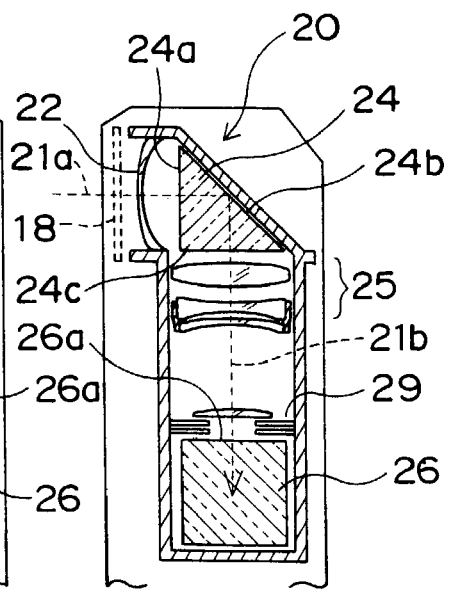
FIG. 3B is a partial side cross-sectional view of the main part of the digital camera according to the first embodiment.

Next, with reference to FIGS. 2, 3A and 3B, it is explained about the bending optical unit 20 in more detail.

That is, in the figures, a reference numeral 21a indicates a first optical axis of light in the bending optical unit 20, and the first optical axis 21a is generally perpendicular to the front surface 11, extending vertically, of the camera body 12. On the other hand, a reference numeral 21b indicates a second optical axis of light therein, and the second optical axis 21b extends vertically (i.e. in a direction up and down in FIG. 2) and in parallel with the front surface 11 of the camera body 12. On the other hand, a reference numeral 21c indicates a third optical axis of light therein, and the third optical axis 21c extends horizontally (i.e. generally in a direction right and left in FIG. 2) and in parallel with the front surface 11 of the camera body 12.

Opposing (or facing) the lens opening part 18, there is arranged an object lens 22 backward of the lens opening part 18; and behind the object lens 22, there is mounted the first triangular prism 24. In the arrangement, the object light passes through the lens opening part 18 and through the object lens 22, and then the object light enters the first triangular prism 24 through the incident surface 24a thereof. Then, the object light is reflected internally and perpendicularly by an inclined surface (or oblique surface) 24b, or the object light is reflected downwards thereby as shown in FIG. 3B. Then, the object light exits, or outgoes, from the first triangular prism 24 through an exit surface (or outgoing surface) 24c thereof.

A beam of light (or light flux or luminous flux) which has exited from the exit surface 24c, passes through a first group of lenses (or first lens group) 25, and the beam thereof enters the second triangular prism 26 through an incident surface 26a thereof. Then, the beam of light is reflected internally and perpendicularly by an inclined surface 26b of the second triangular prism 26, into a horizontal beam thereof (i.e. reflected leftwards thereby as shown in FIG. 3A), and then the beam thereof exits from the second triangular prism 26 through an exit surface 26c thereof.

Further, the beam of light which has exited from the exit surface 26c passes through a second group of lenses (or second lens group) 27, and the beam reaches an image taking element 28. The image taking element 28 has a light receiving surface which is arranged so as to cross or traverse the third optical axis 21c. Due to the refraction of each of the object lens 22, the first group of lenses 25 and the second group of lenses 27, the image of the object is focussed upon the light receiving surface of the image taking element 28.

The second group of lenses 27 includes a focus lens; and the first and second groups of lenses 25, 27 form a zoom optical system. The switchover can be made amongst the zooming operation, focussing operation, normal image capturing operation, and macro image capturing operation, by driving, or moving, each of the first group of lenses 25 and the second group of lenses 27 in a direction of its corresponding optical axis, with a driving motor. By the way, FIGS. 3B, 4A and 4B, respectively, show an aperture 29; however, the denotement of the aperture is omitted in FIGS. 1A, 1B and 2.

Figure 4A:
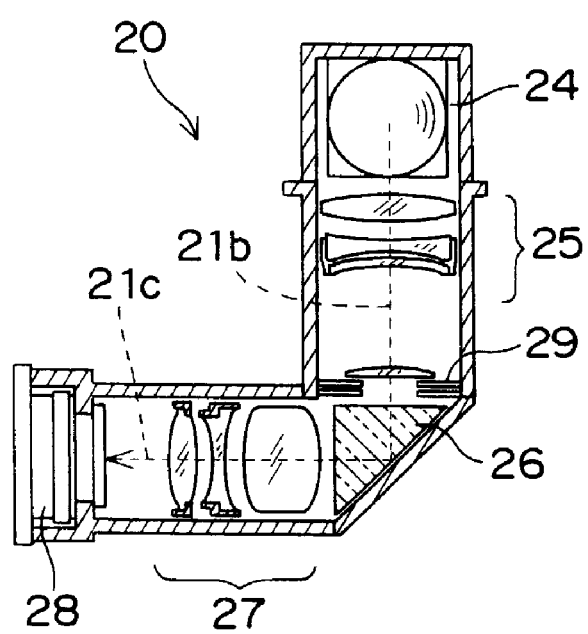
FIG. 4A is an explanatory cross-sectional view of the main part of the bending optical unit of the digital camera according to the first embodiment.
Figure 4B:
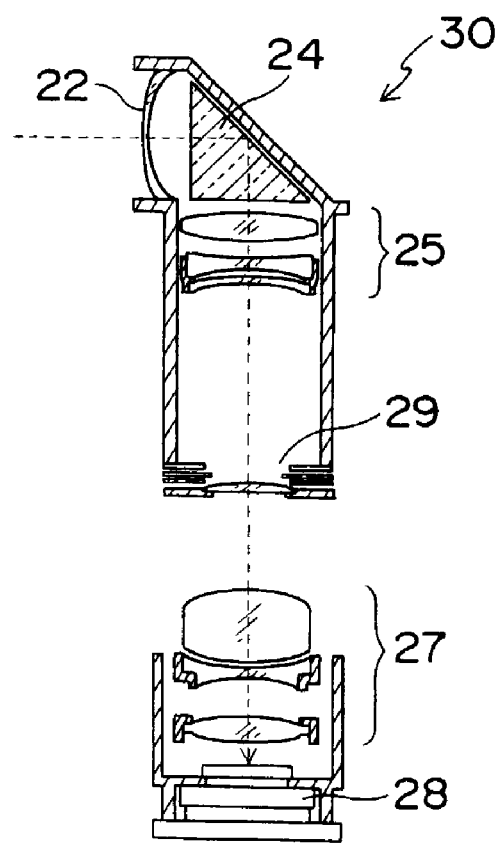
FIG. 4B is an explanatory cross-sectional view of a main part of the bending optical unit in which its optical axis is bent once.

FIG. 4A shows the bending optical system (or bending optical unit) 20 of the digital camera according to the first embodiment, in which the optical axis is bent twice by the first and second triangular prisms 24, 26. In other words, the first light bending and the second light bending are made in the bending optical system or unit. On the other hand, FIG. 4B explanatorily shows a bending optical system 30, in which the optical axis is bent only once by the first triangular prism 24, like a conventional example. In other words, only the first light bending is made in the bending optical system or unit. As clearly shown in those figures, the height (i.e. dimension in the direction of the second optical axis 21b) of the bending optical system (see FIG. 4A) in which the optical axis is bent twice, is smaller than the height of the bending optical system (see FIG. 4B) in which the optical axis is bent once.

Figure 5A:
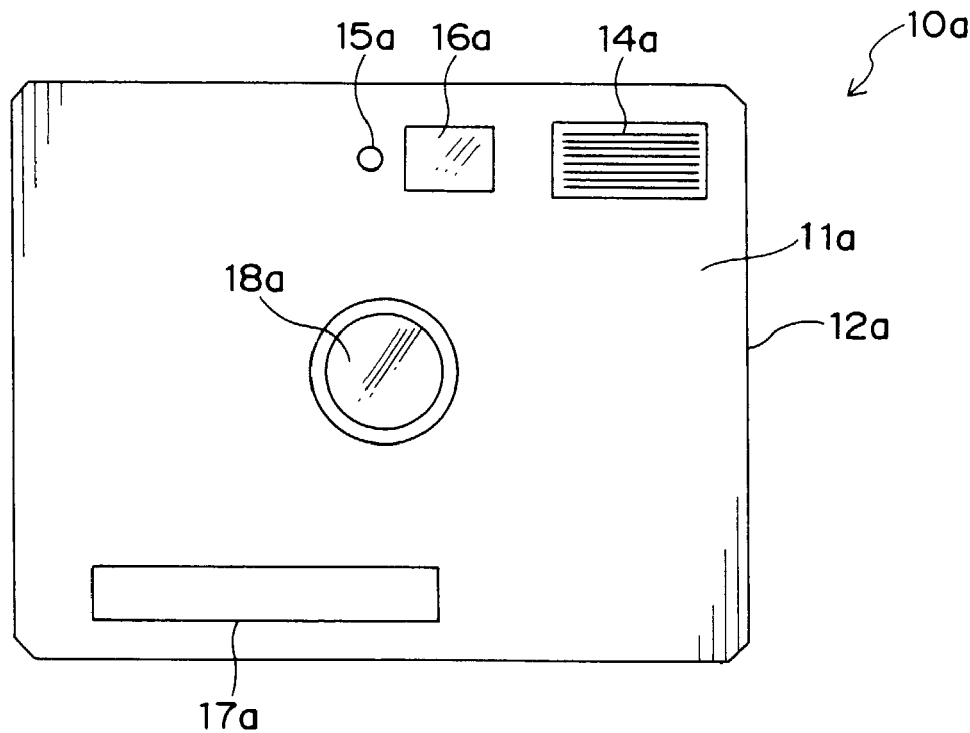
FIG. 5A is a front view of a digital camera according to a second embodiment of the present invention.
Figure 5B:
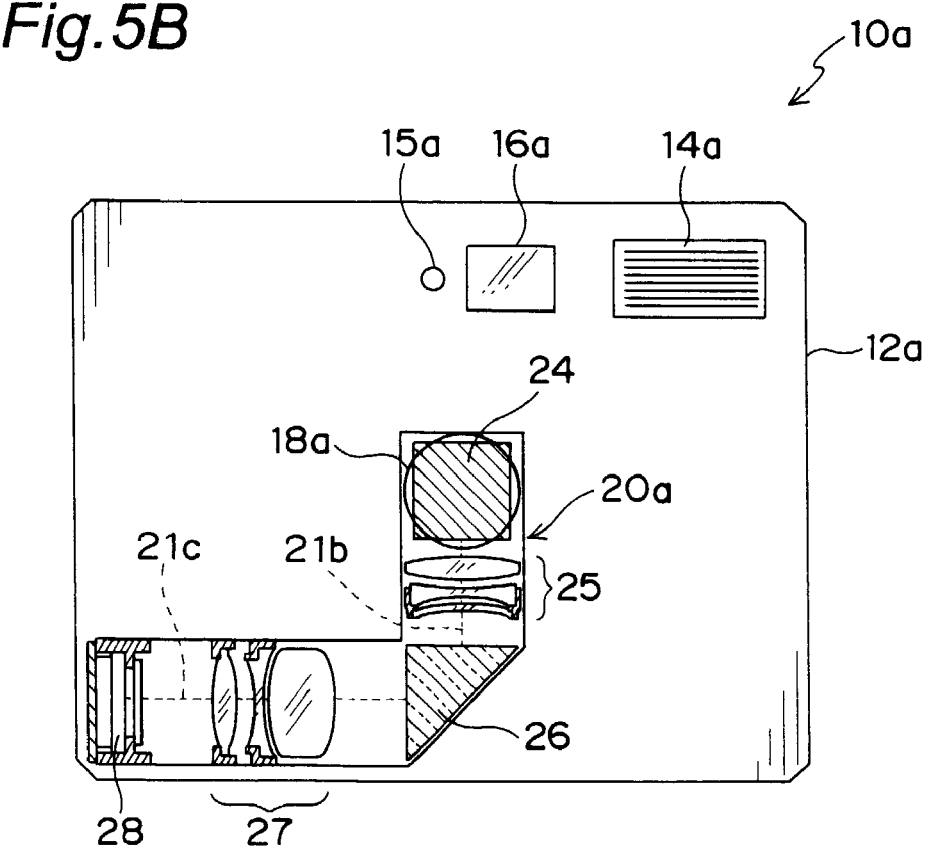
FIG. 5B is a partially cross-sectional front view of the digital camera of FIG. 5A.

Next, with reference to FIGS. 5A and 5B, it is explained about a digital camera 10a according to a second embodiment of the present invention. Hereinbelow, the explanation will be made, focussing mainly on any difference in comparison with the aforementioned first embodiment. Also, hereinbelow, the similar reference numerals will be used for the similar components, or elements, as those employed in the first embodiment.

As shown in a front view, of FIG. 5A, of the digital camera 10a, similar to the first embodiment, the camera 10a has a flash emitter 14a, a photometric sensor 15a, and a viewfinder window 16a, all of which are arranged on an upper part of a front surface 11a of a camera body 12a thereof; and the camera 10a has a name plate 17a on the front lower part of the camera body 12a. Different from the first embodiment, the lens opening part 18a is arranged, generally, at a center of the front surface 11a of the camera body 12a.

As shown in FIG. 5B showing the digital camera 10a, a bending optical unit 20a is mounted inside the camera body 12a thereof, in which the unit 20a has a L-shaped configuration. On end of the unit 20a faces, or opposes, the lens opening part 18a. An object light is bent downwards, in the figure, by the first triangular prism 24, and then the light is bent leftwards, therein, by the second triangular prism 26, inside a lower part of the camera body 12a. In other words, the first light bending by the first triangular prism 24, and the second light bending by the second triangular prism 26, are made in the bending optical system or unit 20a. In this way, the object light which has been bent twice by the pair of triangular prisms 24 and 26, reaches the image taking element 28 locating at the other end of the bending optical unit 20a.

Adopting the configuration, or construction, in which the lens opening part 18a is arranged generally at the center of the front surface 11a of the camera body 12a, it is possible to use, or handle, the camera with a good balance.

Figure 6A:
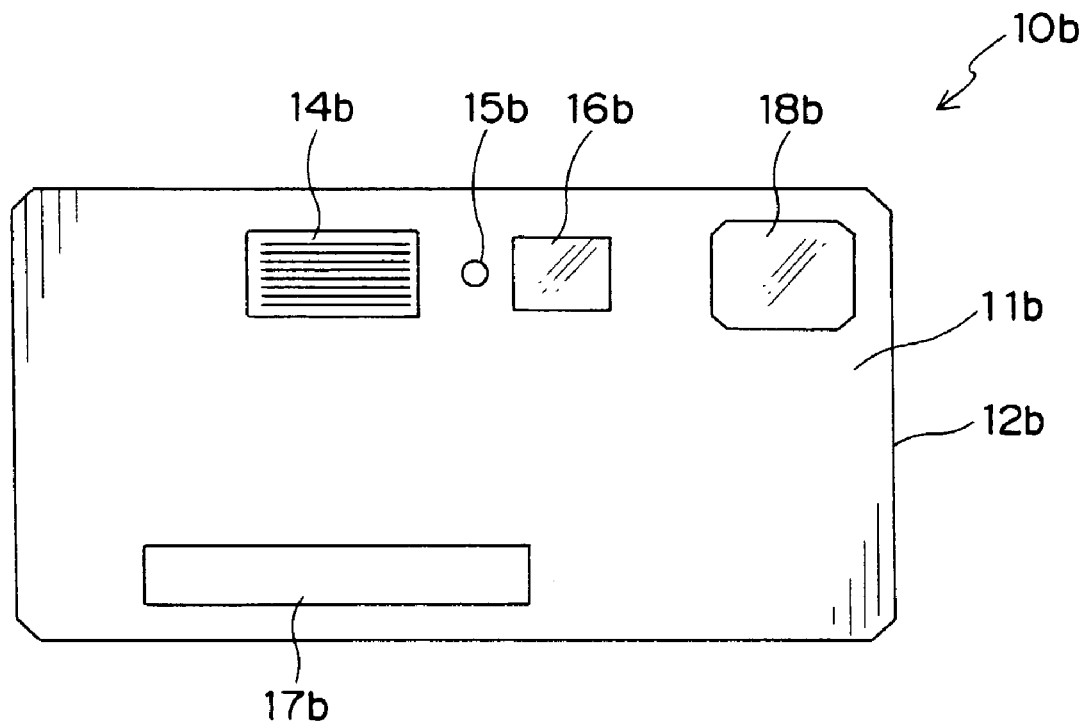
FIG. 6A is a front view of a digital camera according to a third embodiment of the present invention.
Figure 6B:
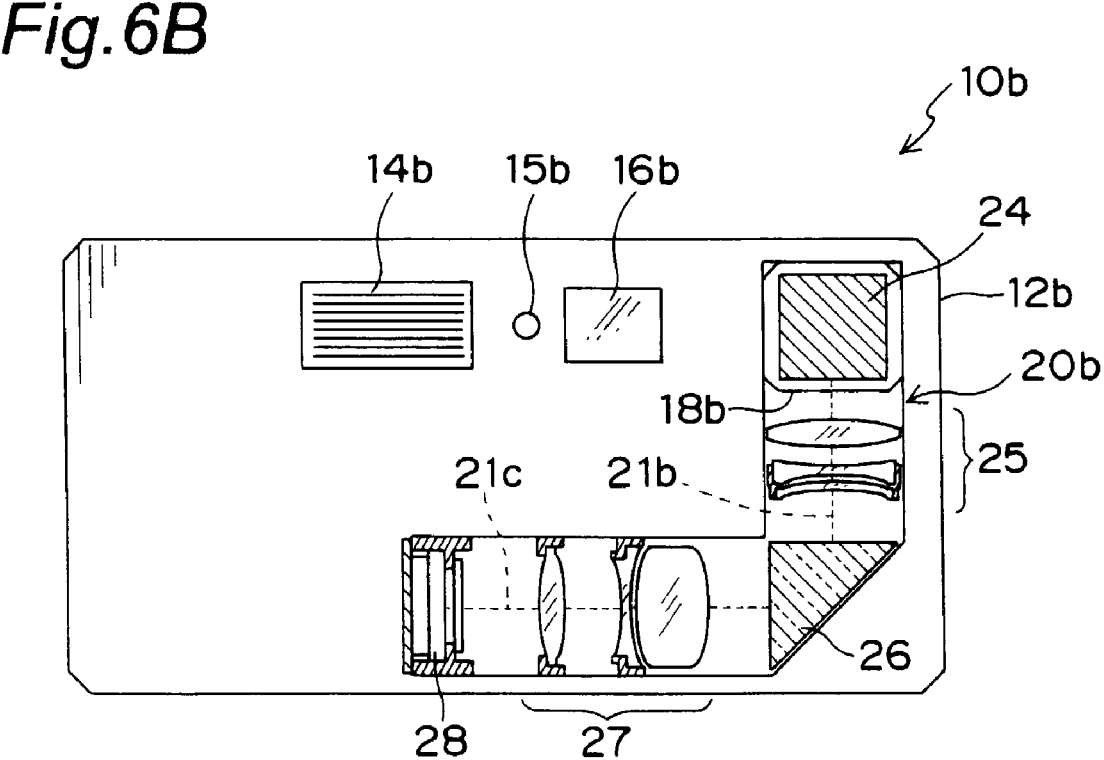
FIG. 6B is a partially cross-sectional front view of the digital camera of FIG. 6A.

Next, with reference to FIGS. 6A and 6B, it is explained about a digital camera 10b according to a third embodiment of the present invention.

Different from the camera body 12 of the first embodiment, the camera body 12b has an elongate shape in which the dimension of its height is smaller than that of its width, as shown in a front view of FIG. 6A. Similar to the digital camera 10 of the first embodiment, the camera 10 has a flash emitter 14b, a photometric sensor 15b, and a viewfinder window 16b, all of which are arranged on an upper part of a front surface 11b of a camera body 12b thereof; and the camera 10b has a lens opening part 18b which is arranged on an upper right part of the front surface 11b of the camera body 12b. On the front surface 11b thereof, a name plate 17b is also arranged on the left lower part of the front surface 11b.

As shown in FIG. 6B, there is mounted a L-shaped bending optical unit 20b inside the camera body 12b, in which the unit 20b is arranged along an inner surface (i.e. along an inner surface of the right wall of the camera body 12b and along an inner surface of the bottom wall thereof, as shown in FIG. 6B) of the camera body 12b. One end of the bending optical unit 20b faces, or opposes, the lens opening part 18b. An object light is bent downwards, in the figure, by the first triangular prism 24, and then the light is bent leftwards, therein, by the second triangular prism 26, inside a bottom part of the camera body 12b. In other words, the first light bending by the first triangular prism 24, and the second light bending by the second triangular prism 26, are made in the bending optical system or unit 20b. In this way, the object light which has been bent twice by the pair of triangular prisms 24 and 26, reaches the image taking element 28 locating at the other end of the bending optical unit 20b. The image taking element 28 is positioned generally centrally near the bottom wall of the camera body 12b.

Figure 7:
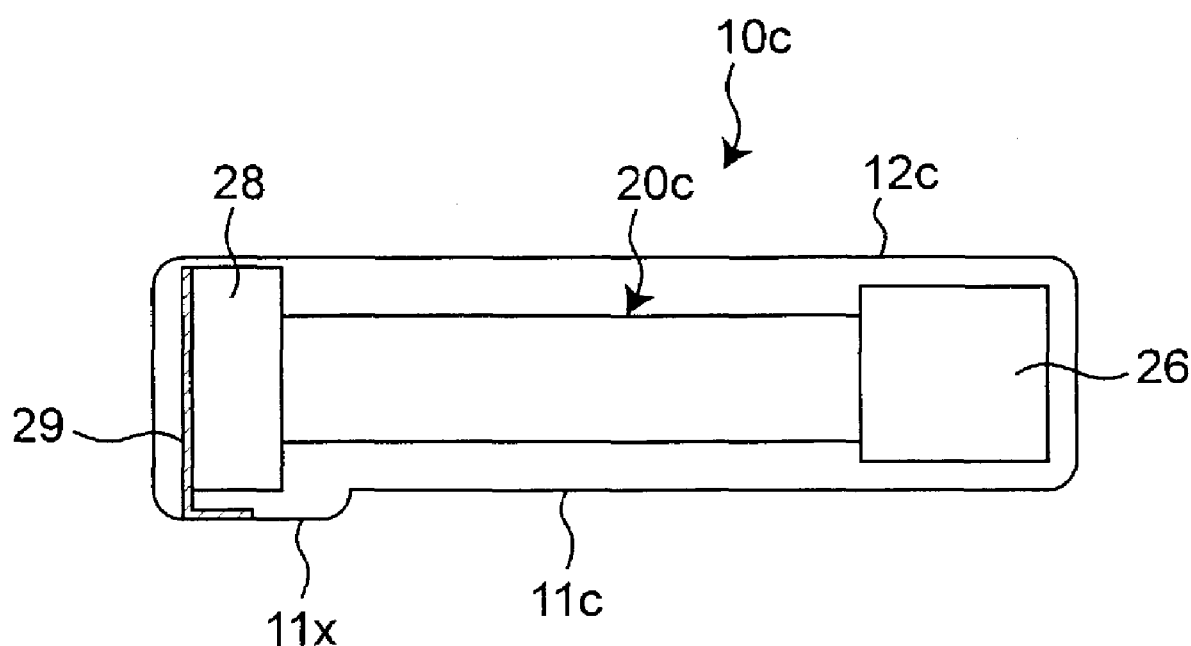
FIG. 7 is a partially cross-sectional bottom view of a digital camera according to a fourth embodiment of the present invention.

Next, with reference to FIG. 7, it is explained about a digital camera 10c according to a fourth embodiment of the present invention.

FIG. 7 is a partially cross-sectional bottom view of a camera body 12c of the digital camera 10c. This camera 10c has a construction similar to that of the digital camera 10b of the third embodiment. A main difference in construction of this digital camera 10c in comparison with that 10b of the third embodiment, is that the image taking element 28 is arranged opposite the second triangular prism 26, and that a part, including the third optical axis 21c, of the bending optical unit 20c is arranged over the whole bottom part of the camera body 12c.

In the construction, a heat radiation plate (or heat sink) 29 for the image taking element 28 is mounted adjacent to an inner surface of a side wall of the camera body 12c. Therefore, the heat generated by the image taking element 28 can be easily let to go (i.e. the effect of heat release, or the effect of heat radiation, is enhanced).

Also, in the construction, there is arranged a gripping part 11X which is an expanded part of the camera body 12c on a side of the image taking element 28 which is housed inside the gripping part 11X. According to the construction, the image taking element 28 is accommodated inside its larger space formed inside the gripping part 11X. Therefore, with the construction, it is possible not only to make the camera body 12c thin (or slim) or low-profile as a whole, but also to shape the camera body into a configuration allowing its user to easily hold, or grip, it.

Next, with reference to FIGS. 8A through 10B, it is explained about a digital camera 50 according to a fifth embodiment, and about a digital camera 50a according to a modification to the fifth embodiment, of the present invention.

The digital camera 50 of the fifth embodiment as shown in FIGS. 8A through 9B, is of a separate type in which its camera body can be separated or divided into two parts: a camera part 60 and a lens part 70.

Figure 8A:
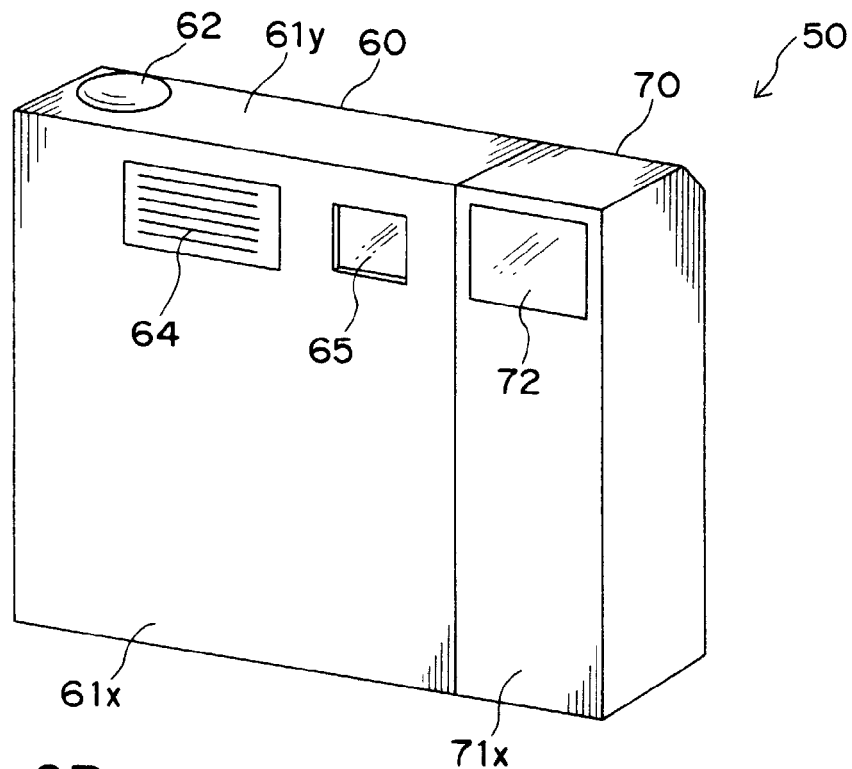
FIG. 8A is a perspective view showing an appearance of a digital camera according to a fifth embodiment of the present invention, in which a camera part of the digital camera and a lens part thereof are connected to each other.
Figure 8B:
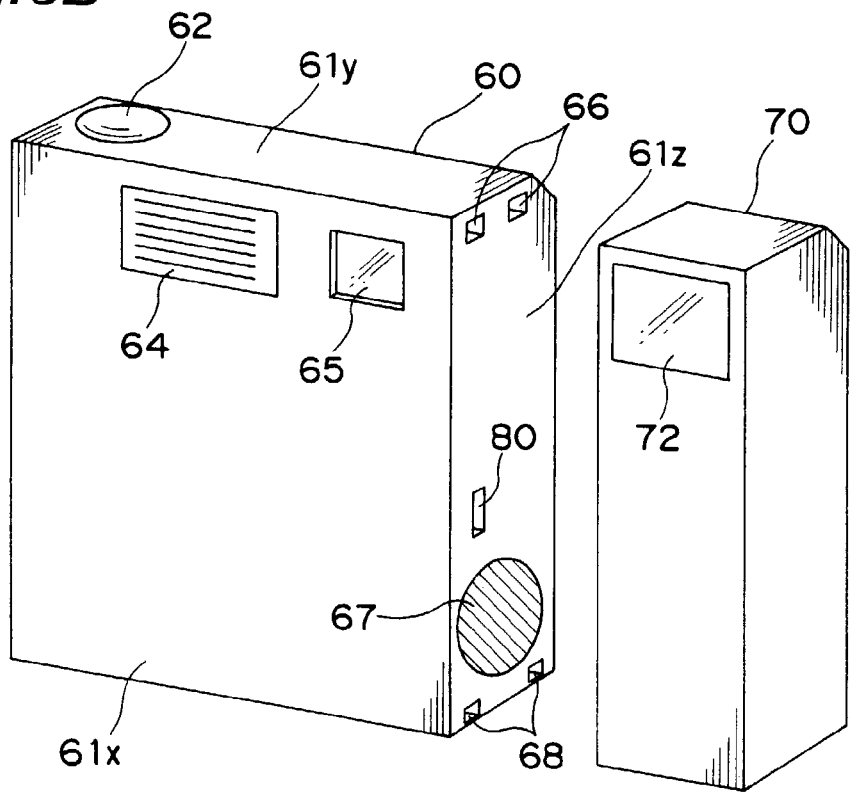
FIG. 8B is a perspective view showing an appearance of the digital camera of FIG. 8A, in which the camera part of the digital camera and the lens part thereof are separated from each other.

Namely, as shown in views, of FIGS. 8A and 8B, showing an appearance of the digital camera 50, the digital camera 50 has the two parts: the camera part 60 and the lens part 70, as aforementioned. The camera part 60 and the lens part 70 can be removably connected to each other.

As shown in FIG. 8A, there are arranged a flash emitter 64 and a viewfinder window 65 on a front surface 61X of the camera part 60; and there is arranged a release button 62 on a top surface 61y of the camera part 60. On the other hand, there is provided a lens opening part 72 on a front surface 71X of the lens part 70.

As shown in FIG. 8B, there are provided an upper coupling part 66 and a lower coupling part 68 on an upper part and a lower part of a right side surface 61Z of the camera part 60, respectively, in order to connect the camera part 60 to the lens part 70. Namely, as shown in FIGS. 9A and 9B, there are provided an upper hook-shaped projection 76 and a lower hook-shaped projection 78 on an upper part and a lower part of a left side surface of the lens part 70, respectively; and these upper and lower hook-shaped projections 76 and 78 can engage with the upper and lower coupling parts 66 and 68 of the lens part 70, respectively.

In addition, on the lower part of the right side surface 61Z of the camera part 60 (FIG. 8B), there is arranged an optical connector 67, as a mount part, whereby the optical system of the camera part 60 and that of the lens part 70 are connected to each other optically. Also, on the lower part of the right side surface 61Z of the camera part 60, and on the lower part of the left side surface of the lens part 70, there are mounted the electric connectors 80 and 82, respectively, in order to connect both to each other electrically (FIGS. 9A and 9B). There is mounted a transparent member, such as a glass, a filter or the like, over the optical connector 67, in order to prevent the optical system of the camera part 60 from exposing outside.

Figure 9A:
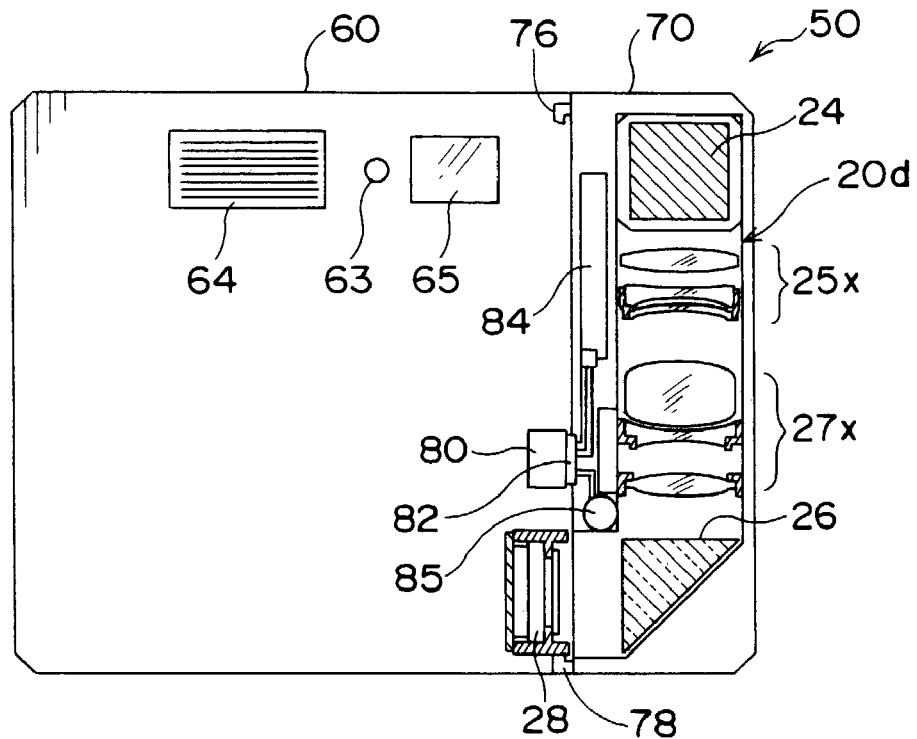
FIG. 9A is a partially cross-sectional front view of the digital camera of FIG. 8A, in which the camera part of the digital camera and the lens part thereof are connected to each other.
Figure 9B:
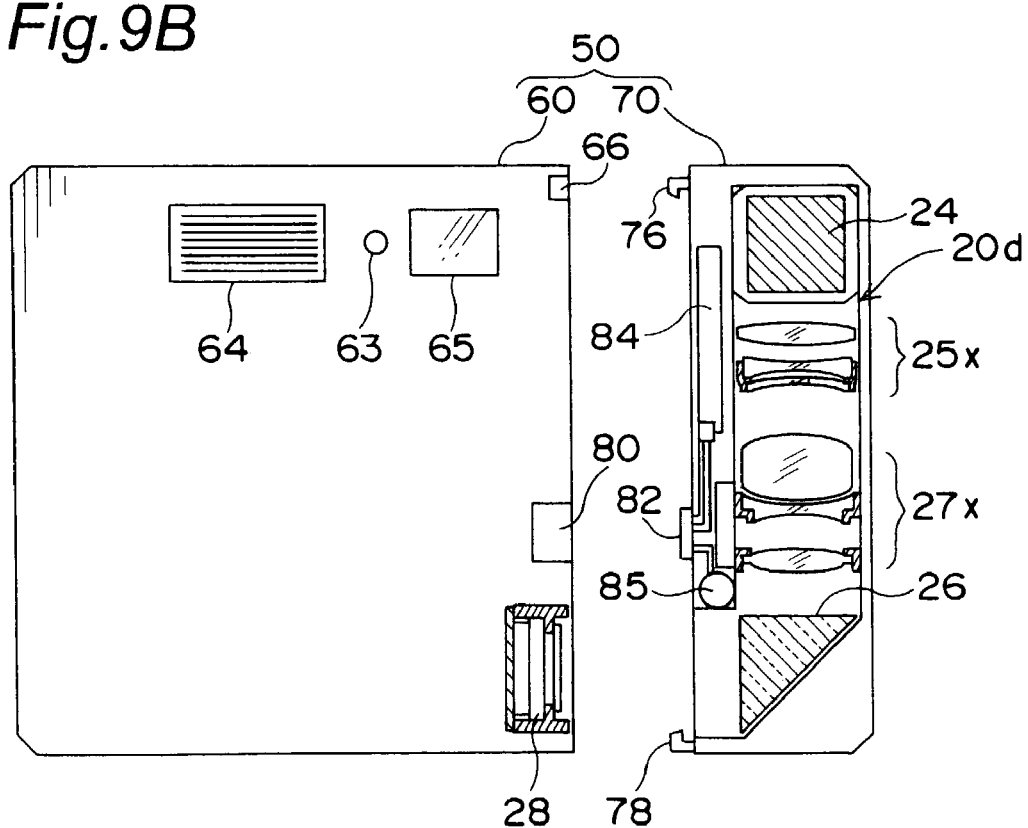
FIG. 9B is a partially cross-sectional front view of the digital camera of FIG. 8A, in which the camera part of the digital camera and the lens part thereof are separated from each other.

As shown in FIGS. 9A and 9B, the image taking element 28 is mounted inside the camera part 60, in which the image taking element 28 opposes, or faces, the optical connector 67. Inside the lens part 70, there is arranged a bending optical unit 20d.

One end of the bending optical unit 20d opposes, or faces, the lens opening part 72 (FIG. 8B). That is, in the figure, an object light having passes through the lens opening part 72 is bent downwards by the first triangular prism 24; the light is bent leftwards by the second triangular prism 26; and then the light reaches the image taking element 28 of the camera part 60. In other words, the first light bending by the first triangular prism 24, and the second light bending by the second triangular prism 26, are made in the bending optical system or unit 20d.

The electric connector 82 of the lens part 70 is electrically connected to a pair of motors for separately, or independently, driving a pair of groups of lenses (i.e. a first group of lenses 25X and a second group of lenses 27X); and the electric connector 82 is also electrically connected to a control circuit board 84. With the arrangement, the motor can be supplied with electricity and/or the lens part 70 can communicate with the camera part 60 to transmit data therebetween. By the way, only one motor 85 out of the two, is shown in FIGS. 9A and 9B.

Figure 10A:
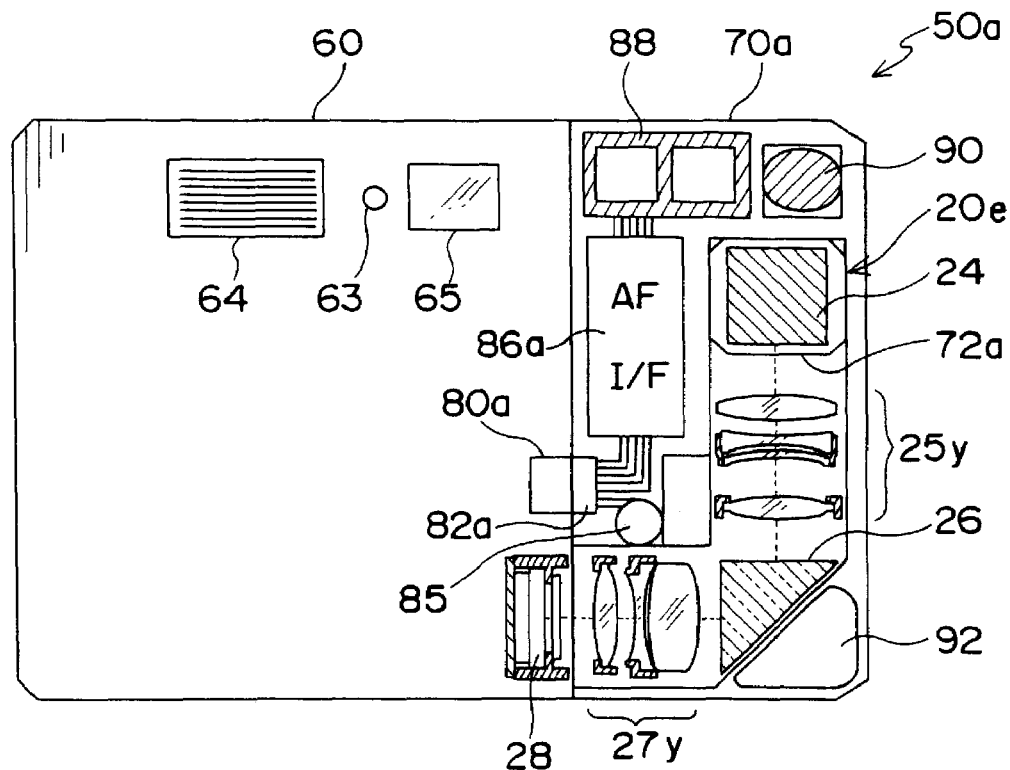
FIG. 10A is a partially cross-sectional front view of a digital camera according to a modification to the digital camera of FIG. 8A, in which the lens part is replaced by another one and in which the lens part and the camera part are connected to each other.
Figure 10B:
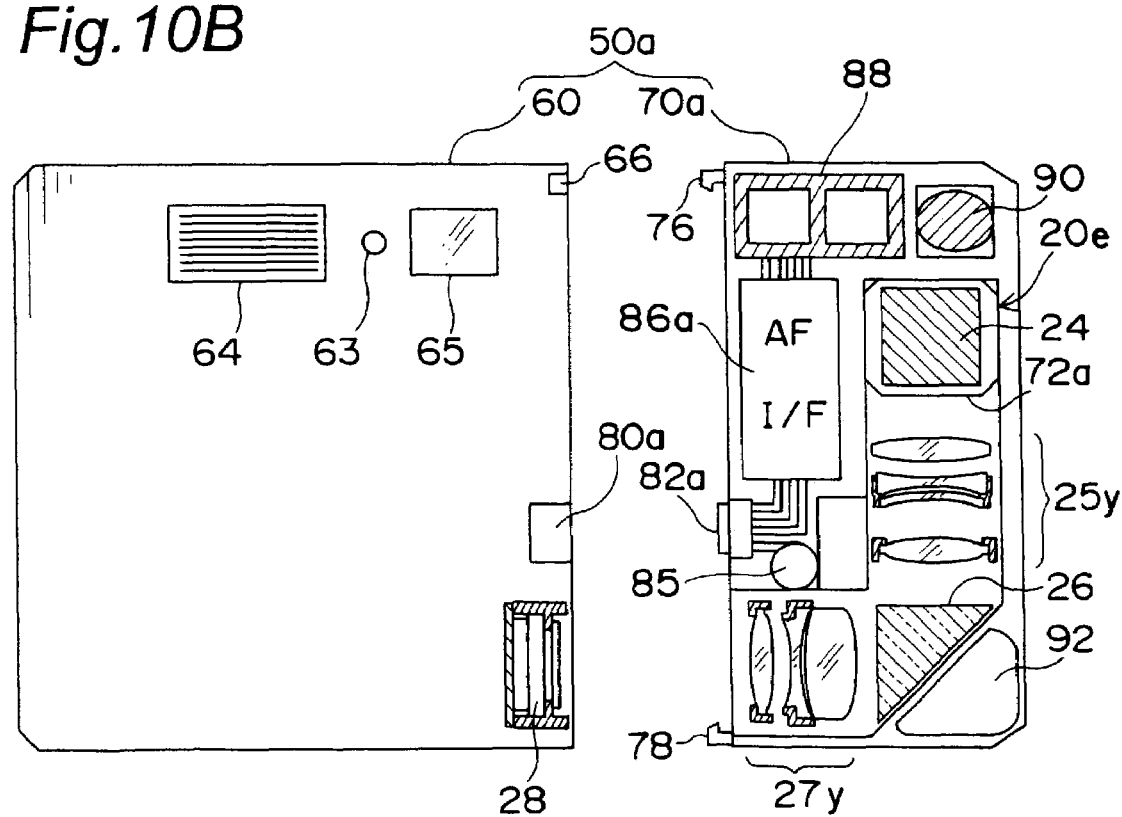
FIG. 10B is a partially cross-sectional front view of the digital camera of FIG. 10A, in which the lens part and the camera part are separated from each other.

The aforementioned digital camera 50 according to the fifth embodiment, can be modified into the one 50a having another lens part 70a which can be removably attached to the camera part 60, as shown in FIGS. 10A and 10B. The digital camera 50a according to the modification to the fifth embodiment, has a construction as follows.

That is, inside the lens part 70a, there are arranged a bending optical unit 20e, a pair of groups of lenses (i.e. a first group of lenses 25y and a second group of lenses 27y), a pair of motors for separately, or independently, driving the pair of groups of lenses 25y and 27y, and a control circuit board 86a. By the way, only one motor 85 out of the two, is shown in FIGS. 10A and 10B.

Different from the aforementioned lens part 70 as shown in FIGS. 9A and 9B, there are arranged a passive type of focussing unit 88 and an AF auxiliary flash emitter 90, both of which are located in an upper part of the lens part 70a; there is arranged a lens opening part 72a under the AF auxiliary flash emitter 90 and the focussing unit 88; and there is arranged an auxiliary battery 92 inside a lower part of the lens part 70a.

The passive type of focussing unit 88 is fundamentally the same as the conventional one which is employed, for example, in a compact camera employing a film. That is, the passive type of the focussing unit 88 is an area type of focussing unit, and it has a two-dimensional focussing region. The ouput from the passive type of the forcussing unit 88, is processed by a CPU on the control circuit board 86a. On the basis of the results, or outcomes, gained from the processing operation executed by the CPU, the AF operation (i.e. auto focussing operation) is performed so that the focussing lens of the bending optional unit 20e is moved to and stopped at a desired focussing position.

The AF auxiliary flash emitter 90 is mounted adjacent to the passive type of focussing unit 88. The AF auxiliary flash emitter 90 emits a flash light at time of focussing an object in a dark place, for example.

The auxiliary battery 92 is accommodated inside a space beside the second triangular prism 26 which is positioned in the bottom of the lens part 70a. The auxiliary battery 92 is of a rechargeable type. The battery 92 is used as an electric source for the passive type of focussing unit 88 and for the AF auxiliary flash emitter 90, inside the lens part 70a. In other words, in the arrangement, the auxiliary battery 92 is the electric source supplying electricity to the additional components that are added to the components in the lens part 70, which is of a normal type, of the digital camera 50 as shown in FIGS. 8A through 9B.

Next, in relation to the separate type of the digital camera 70 and 70a, it is explained about some kinds of the camera parts and the lens parts.

The lens parts can be sorted, as shown in the following Table 1, for example, on the basis of its function.

TABLE 1

Sort on Basis of Function of Lens Part

| Sort | Type | |
|---|---|---|
| Focal Length | Zoom Lens | 28–90 mm (In Terms of 35 mm Film) |
| | | 35–105 mm (In Terms of 35 mm Film) |
| | Single Focus | 35 mm (In Terms of 35 mm Film) |
| | | 200 mm (In Terms of 35 mm Film) |
| | Macro Lens | 50 mm (In Terms of 35 mm Film) |
| Focal Adjustment | Video AF | No Addition |
| | Passive AF | Passive Type Focussing Device + Auxiliary Light LED |
| | Manual Type | Focus Operational Member |

It is possible to select one of the lens parts, like a selection of one of interchangeable lenses used for a single-lens reflex camera, depending upon its use or intended purpose.

The lens part 70 employs image data from the image taking element 28 of the camera part 60 so that the auto focussing operation (video auto focussing operation) is performed. In this case, there is no need of mounting a separate focus detector.

To employ the video auto focus (or video AF) is disadvantageous in any dark place. Therefore, the lens part 70a equipped with an outside light passive type of focussing unit 88 has the AF auxiliary flash emitter 90. In contrast with the lens part 70 (see FIGS. 8A–9B), the size of the lens part 70a (see FIGS. 10A and 10B) becomes relatively larger than that of the lens part 70, more or less. However, since the lens part 70a has the AF auxiliary flash emitter 90, it is possible to measure a distance between an object (or subject) and the digital camera 50a, even in the dark place.

Alternatively, it is possible to prepare another lens part having a focus adjustment member, in order to be able to perform its focus adjustment manually when the video auto focus function is turned off.

The camera parts can be sorted, as shown in the following Table 2, for example, on the basis of its function.

TABLE 2

Sort on Basis of Function of Camera Part

| Sort | | Type |
|---|---|---|
| Image Taking Element | Pixel Size | 2 M Type<br>3 M Type<br>4 M Type |
| Recording Media | Compact Flash<br>Smart Media | In Terms of Micro Drive |
| Mode | Photographing Mode | In Terms of High Speed Sequential Photo Taking/Moving Image |
| | Communicating Function | Equipped with Bluetooth |
| | Night-vision Photography | High Sensitivity CCD |

By exchanging the camera parts, the digital camera can be prepared for any particular use.

According to the digital camera of each of the first through fifth embodiments, the bending optical unit 20, 20a, 20b, 20c, 20d and 20e in which the optical axis is bent twice therein, is employed. With the arrangement, the low-profile and rectangular digital camera with a minimum thickness in the direction in which the camera is moved relative to the object (or subject), can be surely realized.

Also, with the arrangement, the dimension in the direction other than the direction in which the camera is moved relative to the object, can be made smaller, in addition to the realization of the minimum thickness of the camera. For example, with the arrangement, it is possible to equip the digital camera with a high magnification zoom optical system (or unit) with the height of its camera body being suppressed or reduced.

Also, with the arrangement, it is possible to make the camera body of the digital camera smaller, or more compact, with the same focal length (or focal distance) thereof being kept or maintained.

Also, with the arrangement of the separate type of digital camera, like the one according to the fifth embodiment, or like the one according to the modification to the fifth embodiment, in which the camera part and the lens part can be separated from each other, the effect similar to that of exchange of lenses used in the single-lens reflex camera can be realized. For example, depending upon its use, it is possible to select and employ one of a group of interchangeable lenses: a zoom lens, a wideangle lens, a telephoto lens, a macro lens, and the like.

Also, with the arrangement of the separate type of the digital camera, it is possible to prepare a camera which is able to form a different size of image, a camera that a weight is laid on any motion picture (moving image), a camera for sequential image capturing in which an interval between times of image capturing of an object is short, a camera which allows different types of recording media to be employed, a camera which makes it possible to add a communicating function thereto, or the like, as a different type of digital camera.

Although the present invention has been fully described in connection with the preferred embodiments thereof with reference to the accompanying drawings, it is to be noted that various other changes and modifications are also apparent to those skilled in the art.

For example, according to the aforementioned digital camera, the prism is employed in order to bend the optical axis. Alternatively, instead of employing the prism, it is possible to employ a reflection mirror, or the like.

Such changes and modifications are also to be understood as included within the scope of the present invention as defined by the appended claims unless they depart therefrom.

What is claimed is:

1. A digital camera comprising:
   a camera body which is generally rectangular parallelepiped in shape, in which the camera body has a front surface wall that is opposite to an object and that has an opening part, and in which thickness of the camera body in a direction in which the front surface wall is opposite to the object is smaller than height of the camera body and is smaller than width of the camera body;
   an image taking element having a light receiving surface;
   an image taking optical unit disposed inside the camera body and including at least one lens element, said image taking optical unit forming an image of the object on the light receiving surface of said image taking element;
   a first reflection member which is mounted inside said image taking optical unit, in which the first reflection member has a first reflection surface for generally perpendicularly bending a first optical axis of light which is incident through the opening part of the camera body, and in which the first optical axis of light is generally perpendicular to the front surface wall of the camera body; and
   a second reflection member which is mounted inside said image taking optical unit, in which the second reflection member has a second reflection surface for bending a second optical axis of light having been bent by the first reflection surface, into a third optical axis of light, and in which each of the second optical axis and the third optical axis is generally in parallel with the front surface wall of the camera body;
   wherein said image taking element is disposed so as to cross the third optical axis of light, and
   wherein at least one lens element is provided between the opening part of the camera body and the light receiving surface of the image taking element.

2. The digital camera as claimed in claim 1, which further comprises:
   a grip part which is constituted by a projecting part of the camera body, in which the grip part is provided at least on one end of the camera body in a direction of the width thereof, in which the image taking element is mounted inside the grip part.

3. The digital camera as claimed in claim 1, in which the opening part of the camera body is provided adjacent to a corner of the front surface wall thereof, wherein the camera body has four side surface walls connecting to the front surface wall, in which the second optical axis of light and the third optical axis thereof extend along adjacent two side surface walls of the four side surface walls.

4. The digital camera as claimed in claim 1, in which opening part of the camera body is provided generally at a central part of the front surface wall,
wherein the camera body has four side surface walls connecting to the front surface wall, in which the second optical axis of light extends towards one of the four side surface walls, and in which the third optical axis thereof extends along the one of the four side surface walls.

5. The digital camera as claimed in claim 1, in which the camera body comprises a camera part including the image taking element and a lens part including the image taking optical unit,
wherein the camera part and the lens part can be connected to each other removably.

6. The digital camera as claimed in claim 5, in which the lens part is interchangeable.

7. The digital camera as claimed in claim 6, in which the lens part can be selected from one of interchangeable lenses including a zoom lens, a telephoto lens, a macro lens and a wide angle lens.

8. The digital camera as claimed in claim 6, in which the lens part which is interchangeable, comprises an auxiliary flash emitter, a focusing device and an auxiliary electric source.

9. The digital camera as claimed in claim 6, in which the lens part which is interchangeable, comprises a focus adjustment member.

10. The digital camera as claimed in claim 5, in which the camera part is interchangeable.

11. The digital camera as claimed in claim 1, which further comprises:
a first movable lens group which includes at least one lens element crossing the second optical axis and which can move along the second optical axis; and
a second movable lens group which includes at least one lens element crossing the third optical axis and which can move along the third optical axis.

12. The digital camera as claimed in claim 1, wherein the image taking element is arranged on an opposite end of the second reflection member, and wherein a part, of the image taking optical unit, including the third optical axis is arranged over the width of the camera body.

13. A digital camera comprising:
a camera body having a front surface which is opposite to an object, in which the front surface has an opening part;
an image taking element having a light receiving surface;
an image taking optical unit disposed inside the camera body and including at least one lens element, said image taking optical unit forming an image of the object on the light receiving surface of said image taking element;
a first reflection member which is mounted inside said image taking optical unit, in which the first reflection member has a first reflection surface for generally perpendicularly bending a first optical axis of light which is incident through the opening part of the camera body; and
a second reflection member which is mounted inside said image taking optical unit, in which the second reflection member has a second reflection surface for bending a second optical axis of light having been bent by the first reflection surface, into a third optical axis of light, in which the third optical axis of light is included in a plane which is different from a plane in which both of the first optical axis of light and the second optical axis of light are included;
wherein said image taking element is disposed so as to cross the third optical axis of light, and
wherein at least one lens element is provided between the opening part of the camera body and the light receiving surface of the image taking element.

14. he digital camera as claimed in claim 13, in which the camera body comprises a camera part including the image taking element, and a lens part including the image taking optical unit,
wherein the camera part and the lens part can be connected to each other removably.

15. The digital camera as claimed in claim 14, in which the lens part is interchangeable.

16. The digital camera as claimed in claim 15, in which the lens part can be selected from one of interchangeable lenses including a zoom lens, a telephoto lens, a macro lens and a wide angle lens.

17. The digital camera as claimed in claim 15, in which the lens part which is interchangeable, comprises an auxiliary flash emitter, a focusing device and an auxiliary electric source.

18. The digital camera as claimed in claim 15, in which the lens part which is interchangeable, comprises a focus adjustment member.

19. The digital camera as claimed in claim 14, in which the camera part is interchangeable.

20. The digital camera as claimed in claim 13, which further comprises:
a first movable lens group which includes at least one lens element crossing the second optical axis and which can move along the second optical axis; and
a second movable lens group which includes at least one lens element crossing the third optical axis and which can move along the third optical axis.

* * * * *